(12) United States Patent
Furst

(10) Patent No.: US 9,022,431 B2
(45) Date of Patent: May 5, 2015

(54) PIPE FITTING

(76) Inventor: Eitan Furst, Tel Aviv (IL)

( * ) Notice: Subject to any disclaimer, the term of this patent is extended or adjusted under 35 U.S.C. 154(b) by 0 days.

(21) Appl. No.: 12/810,851

(22) PCT Filed: Dec. 22, 2008

(86) PCT No.: PCT/IL2008/001651
§ 371 (c)(1),
(2), (4) Date: Jun. 28, 2010

(87) PCT Pub. No.: WO2009/083955
PCT Pub. Date: Jul. 9, 2009

(65) Prior Publication Data
US 2010/0283235 A1    Nov. 11, 2010

Related U.S. Application Data

(60) Provisional application No. 61/018,500, filed on Jan. 2, 2008.

(51) Int. Cl.
| F16L 33/00 | (2006.01) |
| F16L 33/24 | (2006.01) |
| F16L 19/065 | (2006.01) |
| F16L 19/08 | (2006.01) |
| F16L 37/244 | (2006.01) |

(52) U.S. Cl.
CPC ............ *F16L 33/24* (2013.01); *Y10T 29/49947* (2015.01); *F16L 19/0653* (2013.01); *F16L 19/086* (2013.01); *F16L 37/244* (2013.01)

(58) Field of Classification Search
USPC ............ 285/92, 257, 331, 399–400, 403, 40, 285/251, 248, 258, 353, 246, 243, 259
See application file for complete search history.

(56) References Cited

U.S. PATENT DOCUMENTS

| 2,731,279 | A | * | 1/1956 | Main, Jr. ................ 285/95 |
| 3,820,825 | A | * | 6/1974 | Morin ................ 285/39 |
| 4,219,222 | A |   | 8/1980 | Brusadin |
| 4,427,219 | A | * | 1/1984 | Madej ................ 285/249 |
| 4,477,109 | A | * | 10/1984 | Kleuver ................ 285/361 |
| 4,538,836 | A | * | 9/1985 | Krutten ................ 285/24 |
| 4,626,001 | A | * | 12/1986 | Lee ................ 285/94 |
| 4,627,644 | A | * | 12/1986 | Ekman ................ 285/3 |
| 4,903,993 | A | * | 2/1990 | Brammer ................ 285/24 |
| 6,485,064 | B1 |  | 11/2002 | Davidson |

(Continued)

FOREIGN PATENT DOCUMENTS

| DE | 925326 C | 3/1955 |
| EP | 1150056 | 4/2001 |

(Continued)

*Primary Examiner* — Aaron Dunwoody
(74) *Attorney, Agent, or Firm* — Deborah Gador

(57) ABSTRACT

A pipe fitting including a housing, a connecting cylinder at least partially disposed in the housing, the connecting cylinder being sealingly mounted in the housing, the cylinder having a portion of reduced diameter with a groove defining a sloping shoulder, a pipe fastening element rotatably mounted about the reduced diameter portion of the connecting cylinder and about the groove for selectively engaging the pipe during a quick connect action, and elements for selectively engaging the interior wall of the pipe for permitting removal of the pipe from the fitting when manipulating the pipe fastening element, and a method for forming the fitting.

5 Claims, 6 Drawing Sheets

(56) References Cited

U.S. PATENT DOCUMENTS 7,140,645 B2 11/2006 Cronley
2005/0035597 A1 2/2005 Bamberger et al.

FOREIGN PATENT DOCUMENTS

FR 2317585 A1 2/1977
WO 2006/120671 A2 11/2006

\* cited by examiner

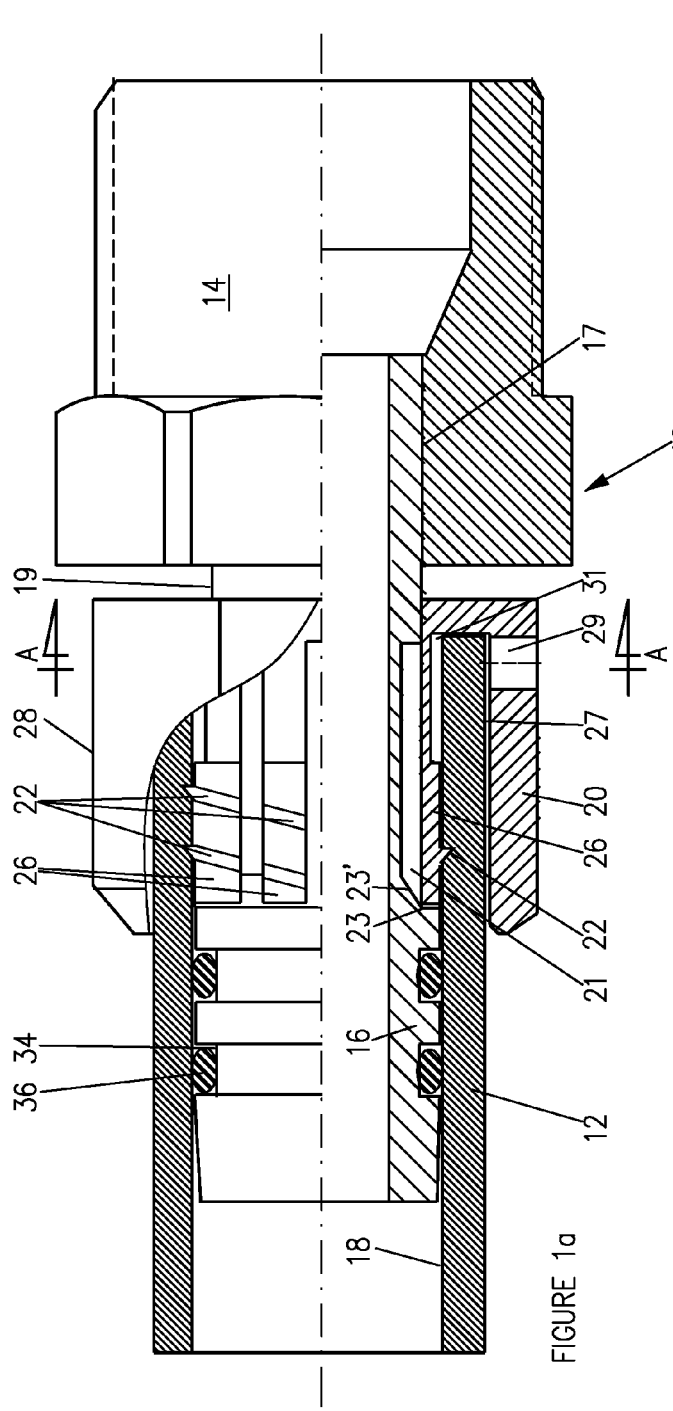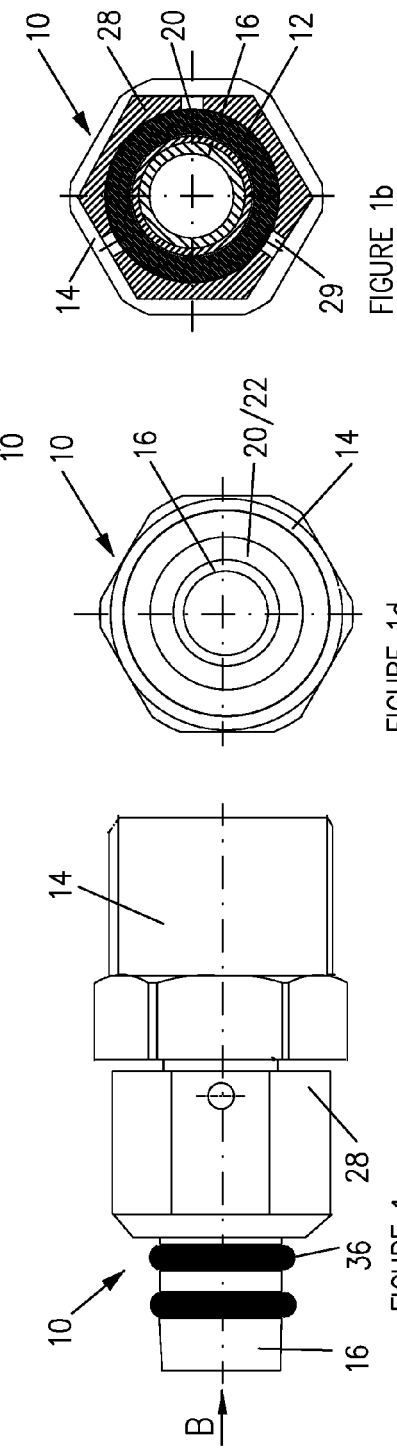

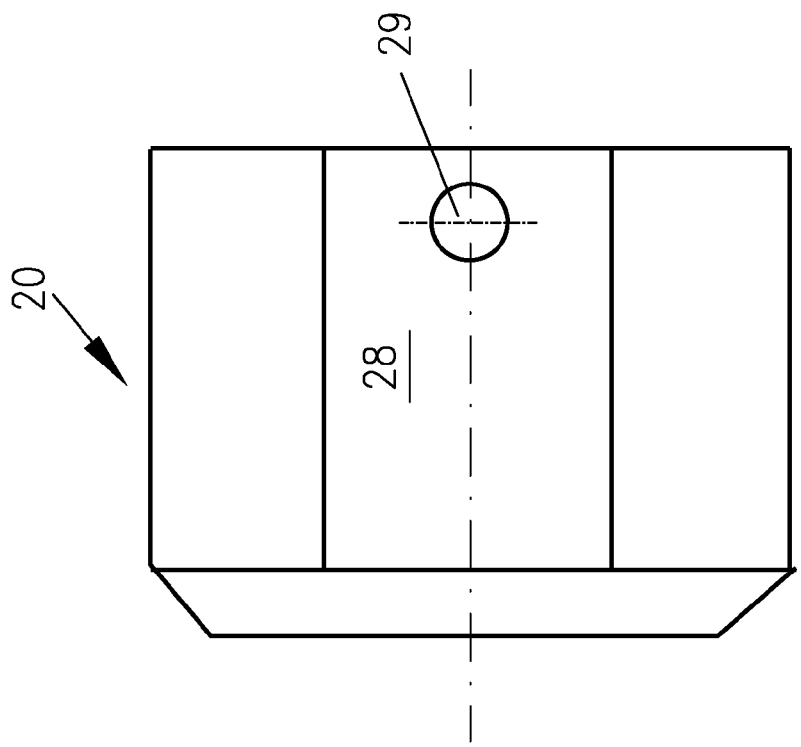
FIGURE 1e – VIEW
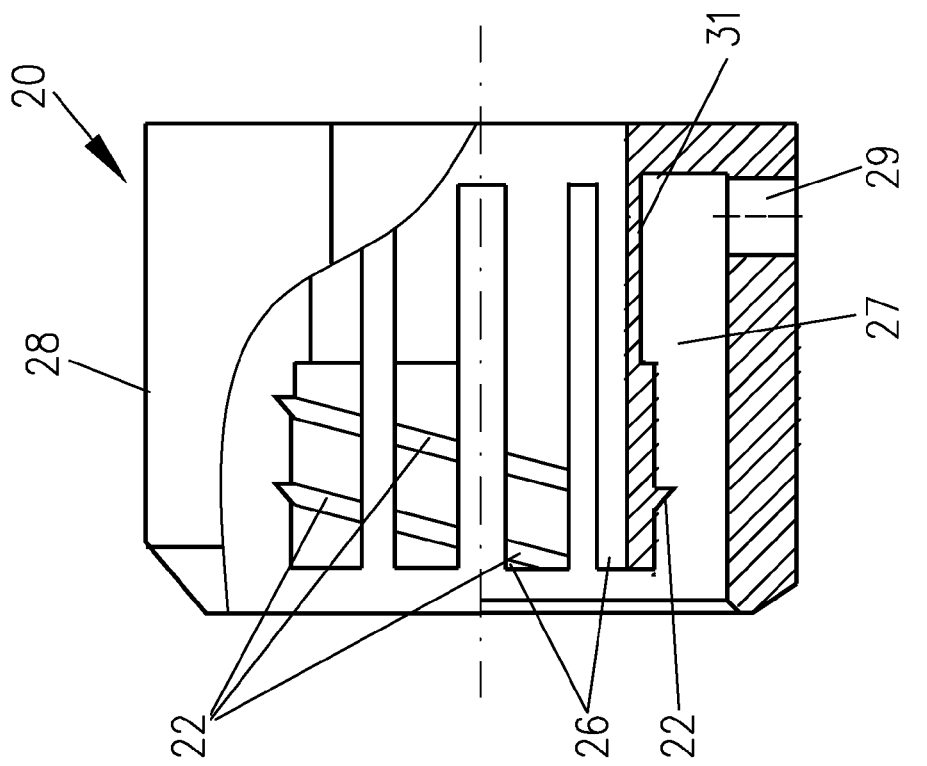
FIGURE 1f – SECTION

PIPE FITTING

FIELD OF THE INVENTION

The present invention relates to pipe fittings, in general and, in particular, to pipe fittings for use with pipes in which a groove can be cut.

BACKGROUND OF THE INVENTION

Pipe fittings for connecting lengths of pipe are well known. When coupling laminar plastic (e.g., polyethylene) pipes and multilayer pipes, it is known to use a fitting including a rotatable, externally threaded nipple to which the pipe can be attached, the nipple having a base shaped to receive a wrench. Rotation of the nipple by a wrench causes the threads on the nipple to cut into the pipe, thereby preventing removal of the pipe from the fitting.

The threaded nipple is rotatably seated inside a locking nut, having an associated gasket, for tightening the nipple to any fitting having a threaded end. However, since the nipple must be coupled to the fitting by the locking nut, this connection might leak because of a faulty seal or insufficient tightening by the user. Therefore, such fitting does not always meet customary standards for use in hidden or inaccessible locations.

There are known fittings which permit rapid coupling to a pipe by pushing the pipe onto the fitting. However, these fittings include arrangements to prevent removal of the pipe from the fitting by simply pulling on the pipe. Therefore, in order to release the fitting from the pipe or vise verse, either the pipe must be cut, which prevents reuse of the fitting, or elaborate equipment is required.

Accordingly, there is a long felt need for a fitting for easy coupling and decoupling to and from plastic or other cuttable pipes.

SUMMARY OF THE INVENTION

There is provided according to the present invention a pipe fitting for a groovable pipe (a pipe in which a groove can be cut), the fitting including a housing and a connecting cylinder at least partially disposed in one side of the housing, the connecting cylinder being sealingly mounted in the housing. The fitting further includes an outer sleeve freely rotatable about the connecting cylinder, having an inner pipe engaging portion with a plurality of horizontal slits defining elongated strips, and an integral, external screws thread adapted and configured to groove and engage an interior wall of the pipe.

BRIEF DESCRIPTION OF THE DRAWINGS

The present invention will be further understood and appreciated from the following detailed description taken in conjunction with the drawings in which:

FIG. 1a is a partially cut-away, partial side sectional illustration of a pipe fitting constructed and operative in accordance with one embodiment of the present invention, with a pipe in a secured orientation;

FIG. 1b is a sectional view through the pipe fitting of FIG. 1a taken along line A-A, with a pipe;

FIG. 1c is a plan view illustration of the pipe fitting of FIG. 1a, without the pipe;

FIG. 1d is an end view of the pipe fitting of FIG. 1c looking from direction B;

FIG. 1e is a side view of a pipe fastening element for the fitting of FIG. 1a constructed and operative in accordance with one embodiment of the present invention;

FIG. 1f is a partially cut-away, partial side sectional view of the pipe fastening element of FIG. 1e;

DETAILED DESCRIPTION OF THE INVENTION

Figure 2:
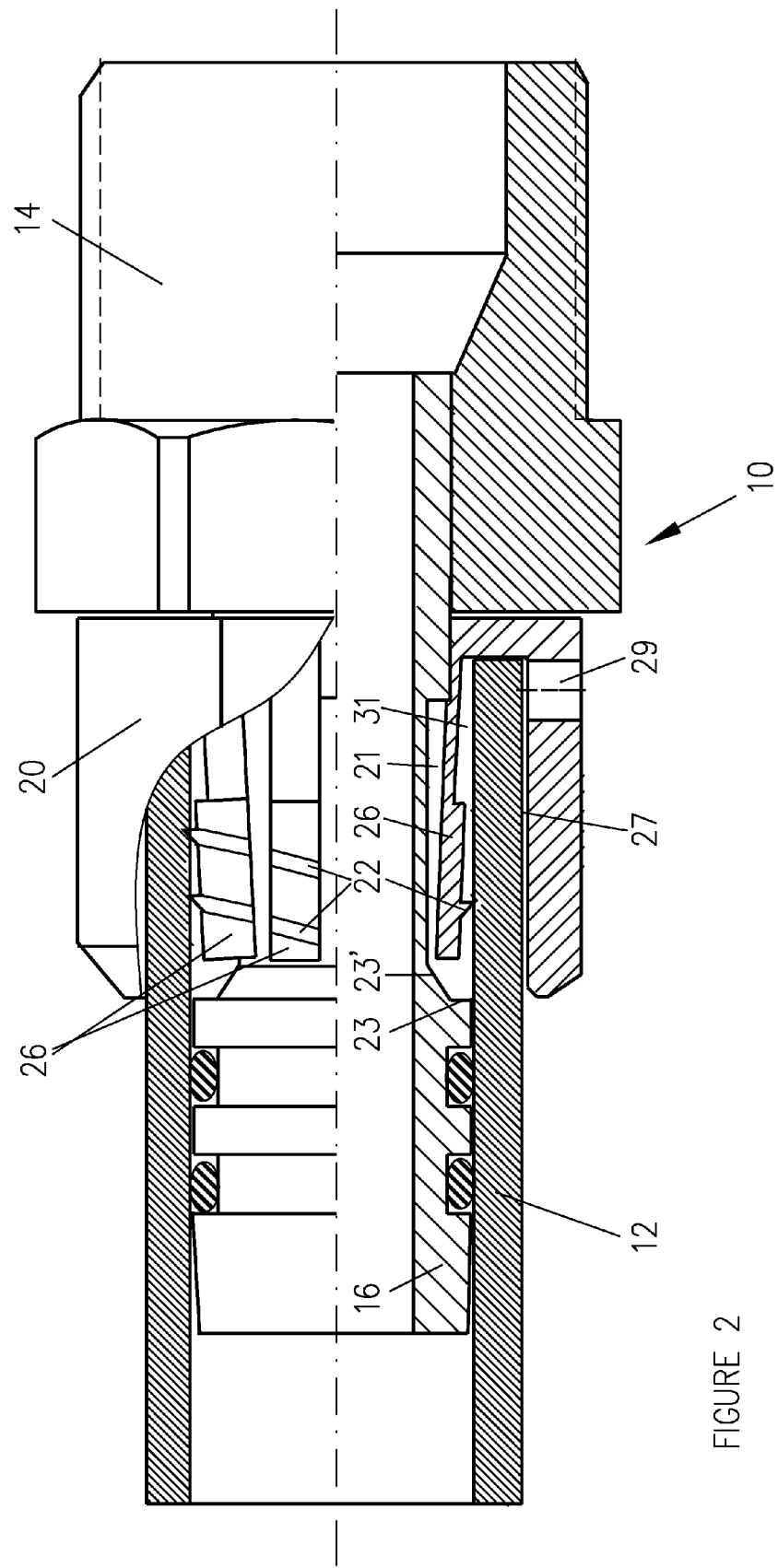
FIG. 2 is a partially cut-away, partial side sectional illustration of the pipe fitting of FIG. 1a wherein the pipe is in the fully inserted position.

The present invention relates to a pipe fitting for groovable pipes which permits quick connection of the pipe to the fitting and permits easy removal of the pipe from the fitting without cutting the pipe thus allowing reuse of the fitting.

The pipe fitting includes a housing with a connecting cylinder sealingly mounted in the housing, the cylinder having a portion of reduced diameter with a groove defining a sloping shoulder. A pipe fastening element is rotatably mounted about the reduced diameter portion of the connecting cylinder and about the groove, for selectively engaging the pipe during a quick connect action. The fitting further includes elements for selectively engaging the interior wall of the pipe for preventing removal of the pipe from the fitting by simply pulling on the pipe yet permitting removal of the pipe from the fitting when manipulating the pipe fastening element.

Referring to FIGS. 1a to 1f, there is shown a pipe fitting 10 constructed and operative in accordance with one embodiment of the present invention for a pipe 12, in which a groove can be cut, referred to herein as a groovable pipe. Pipe fitting 10 includes a housing 14 and a connecting cylinder 16 at least partially disposed in one side of the housing 14. The connecting cylinder 16 is sealingly mounted, as shown at 17, in the housing 14, preferably in accordance with the appropriate standards for hidden pipe fittings. It is a particular feature of the invention that the connecting cylinder is sealingly connected to the housing during manufacture, so no separate tightening nut and associated gasket are required. It will be appreciated that connecting cylinder 16 may also be fully disposed in housing 14. Connecting cylinder 16 may be formed as an integral part of housing 14. Connecting cylinder 16 defines a portion 19 of reduced diameter, which includes an annular groove 21, described in detail below.

Pipe fitting 10 further includes a pipe fastening element 20 freely rotatable about the outer wall of portion 19 of connecting cylinder 16. Pipe fastening element 20, as can be best seen in FIG. 1f, defines an annular pipe receiving recess 27. At least one, and preferably a plurality of elongated strips 26 define the interior wall of recess 27. Each strip has a recessed portion 31 providing flexibility to the strips 26 to allow the free ends thereof to move in and out of groove 21. An integral, external screw thread 22 is defined about the strips 26, such that a portion of screw thread 22 is defined on each strip. Screw thread 22 has a triangular cross-section, sloped on one side and perpendicular to strip 26 on its other side.

As stated above, pipe fastening element 20 is mounted about smaller diameter portion 19 of connecting cylinder 16 about annular groove 21. Groove 21 defines a shoulder 23 having a sloping portion 23'. Portion 19 is longer than the length of pipe fastening element 20, allowing the pipe fastening element to slide reciprocatingly longitudinally along portion 19 until strips 26 abut against shoulder 23 of groove 21. Shoulder 23 serves as a stop member preventing pipe fastening element 20 from sliding off connecting cylinder 16 while the sloping portion 23' thereof urges strips 26 towards pipe 12, whereby threads 22 cut and engage the pipe wall and prevent the pipe from sliding off connector 16.

Referring now to FIG. 2, there is shown a partially cut-away, partial side sectional illustration of the pipe fitting with the pipe 12 pushed all the way into pipe receiving recess 27. As pipe 12 is pushed onto the fitting and into recess 27, the pipe smoothly slides over the sloped side of threads 22 on strips 26, while urging flexible strips 26 inwards into groove 21 and towards one another. As pipe 12 is pushed onto the fitting, pipe fastening element 20 moves towards housing 14 until it abuts against the housing. Preferably, pipe 12 is inserted into annular recess 27 in pipe fastening element 20 until it abuts the end wall of the recess. If desired, one or more apertures 29 may be provided through pipe fastening element 20 to permit a user to verify that the edge of the pipe is fully received within recess 27.

Pulling pipe 12 back, away from housing 14, causes the perpendicular side of screw threads 22 to engage and groove the interior wall 18 of pipe 12. Further pulling of pipe 12 pulls pipe fastening element 20 away from housing 14 and causes strips 26 to slide along the sloped portion 23' of shoulder 23, which urges strips 26 outwards to cut deeper into pipe 12, until they abut against shoulder 23, as shown in FIG. 1a. This causes threads 22 to further engage interior wall 18 of the groovable pipe, until the pipe is fully secured on strips 26. In this orientation, strips 26 are essentially locked in pipe 12 by means of screw threads 22 and shoulder 23.

If desired, one or more additional grooves 34, or recesses, may be provided about connecting cylinder 16 outside of pipe fastening element 20, for receiving one or more o-rings 36, or other suitable sealing elements, for sealing engagement with the inner wall of the pipe.

Figure 3:
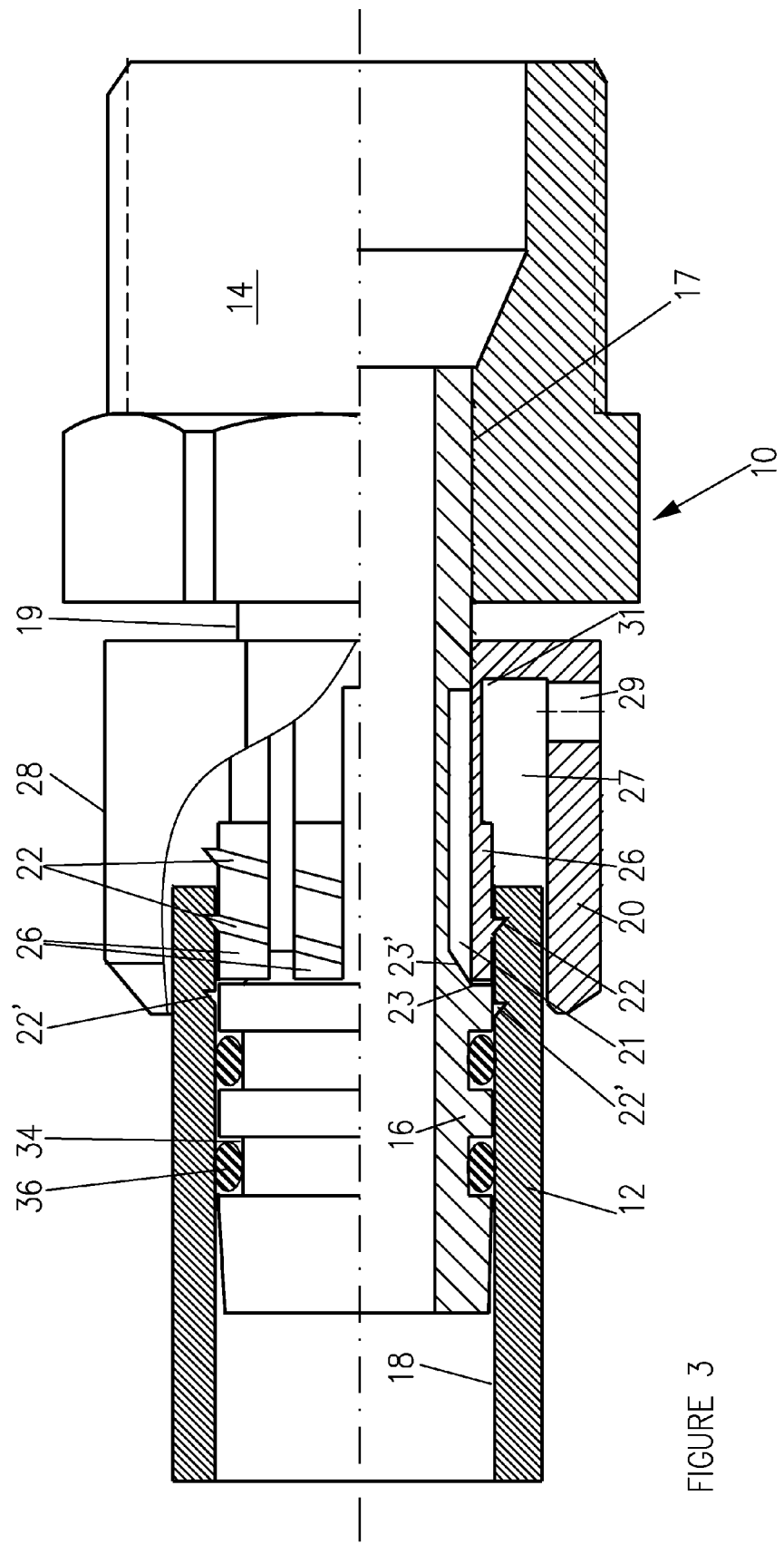
FIG. 3 is a partially cut-away, partial side sectional illustration of the pipe fitting of FIG. 1a wherein the pipe is in a partially removed position.

Pipe fastening element 20 preferably includes an external, manipulable portion 28, to permit rotation of pipe fastening element 20 in order to remove pipe 12 from the fitting. As can be seen most clearly in FIG. 3, rotation of pipe fastening element 20 against the direction of screw threads 22 causes the threads 22 to complete spiral grooves 22' in interior wall 18, creating a screw thread that acts to move pipe 12 backwards out of recess 27 until the pipe can be removed from the fitting.

It will be appreciated that, while the invention is particularly suitable for use with laminated plastic pipes, such as pipes having an inner layer of polyethylene, including PEX pipes, it can also be used with any other pipes which have an interior wall which is soft enough to be grooved but strong enough to be retained firmly by strips 26 when the piping is assembled and to remain in place under conditions of engineering requirements and normal use. It will be further appreciated that the invention may be suitable also for any elastic pipes which can be grooved by strips 26 of the fitting. The fitting may be made of any material suitable for carrying the particular fluid passing through the pipes.

Figure 4:
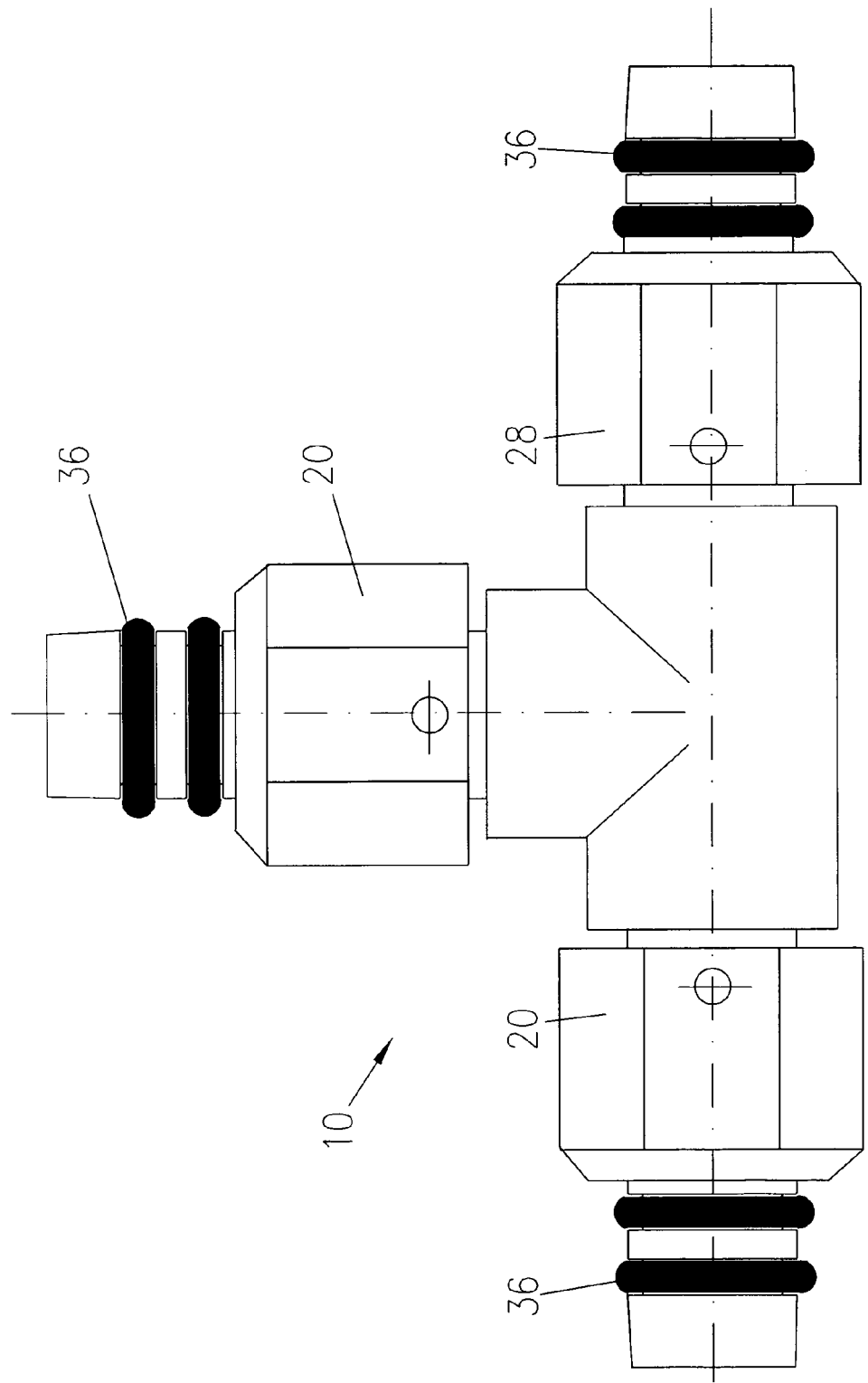
FIG. 4 is a plan view of a pipe fitting known in the art as "a T piece", constructed and operative in accordance with another embodiment of the present invention.
Figure 5:
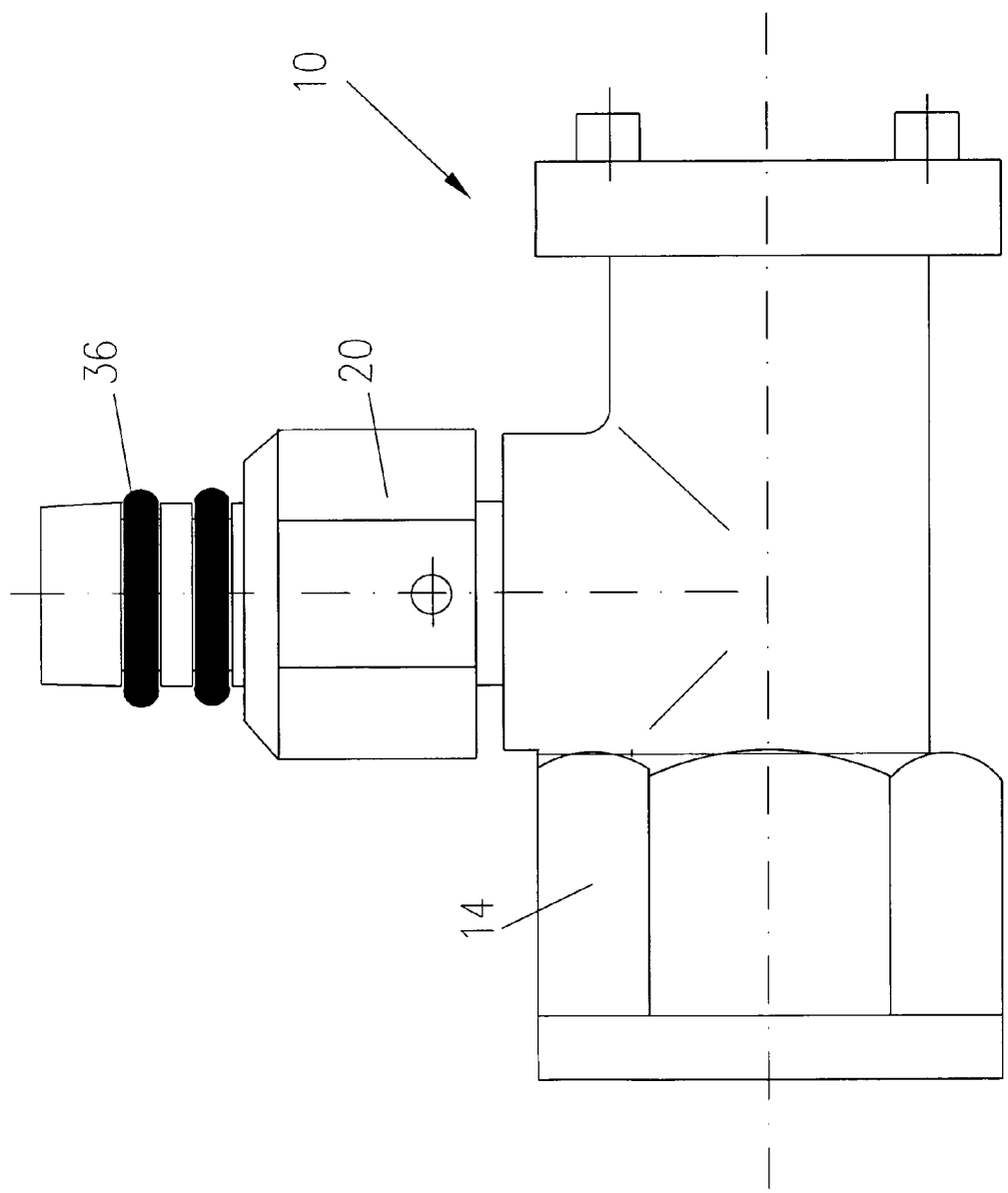
FIG. 5 is a plan view of a pipe fitting known in the art as "a tap connector", constructed and operative in accordance with an alternative embodiment of the present invention.

The pipe fitting 10 of FIG. 1a is illustrated as having a connecting cylinder for coupling to a single pipe. Alternatively, the pipe fitting may have any design and may include a plurality of connecting cylinders with associated pipe connecting elements for coupling to a plurality of pipes. Two additional connectors, each having at least one pipe connecting element according to the invention, are shown in FIGS. 4 and 5, by way of example, only.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A fitting for coupling to a pipe, the fitting comprising:
   a housing;
   a connecting cylinder at least partially disposed in said housing, the connecting cylinder being sealingly mounted in said housing, said cylinder having a portion of reduced diameter with an annular groove defining a sloping shoulder;
   said cylinder further comprising at least one sealing element receiving groove defined about an outside surface of said connecting cylinder, said sealing element receiving groove receiving a sealing element for sealing engagement with an interior wall of a pipe;
   a pipe fastening element defining an annular pipe receiving recess, said pipe fastening element rotatably mounted about said reduced diameter portion of said connecting cylinder and about said annular groove, for selectively engaging a pipe during a quick connect action; and
   said pipe fastening element further defining a flexible pipe engaging portion configured to move in and out of said annular groove and selectively engage an interior wall of the pipe when said pipe engaging portion slides along said sloping shoulder and permitting removal of the pipe from the fitting by relative rotational motion between the pipe and said pipe fastening element.

2. The fitting of claim 1, wherein said flexible pipe engaging portion includes at least two flexible strips defining an inner wall of said recess, and portions of an integral, external screw thread on said at least two strips adapted and configured to cut and engage the interior wall of the pipe until the pipe is fully secured on said screw thread portions of said at least two strips, said at least two strips being disposed adjacent said annular groove and arranged for selective movement into the annular groove, during quick connect, and wherein said portions of a screw thread are disposed, when said pipe fastening element is rotated relative to the pipe, so as to complete spiral grooves in an interior wall of the pipe, creating a screw thread that acts to move the pipe backwards out of said recess so that the pipe can be removed from the fitting.

3. The pipe fitting according to claim 1, wherein said pipe fastening element defines a manipulable portion to facilitate rotation of said pipe fastening element during removal of said pipe from the pipe fitting.

4. The pipe fitting according to claim 2, wherein said pipe fastening element defines a manipulable portion to facilitate rotation of said pipe fastening element during removal of a pipe from the pipe fitting.

5. A fitting for a pipe, the fitting comprising:
   a housing;
   a connecting cylinder at least partially disposed in said housing, the connecting cylinder being sealingly mounted in said housing, said cylinder having a portion of reduced diameter including an annular groove defining a sloping shoulder, said cylinder further comprising at least one sealing element receiving groove, defined about an outside surface of said connecting cylinder, said sealing element receiving groove receiving a sealing element for sealing engagement with an interior wall of a pipe;

a pipe fastening element defining an annular pipe receiving recess, said pipe fastening element rotatably mounted about said reduced diameter portion of said connecting cylinder and about said annular groove, for selectively engaging a pipe during a quick connect action;

said pipe fastening element further defining a flexible pipe engaging portion configured to move in and out of said annular groove and selectively engage an interior wall of the pipe when said pipe engaging portion slides along said sloping shoulder and permitting removal of the pipe from the fitting by relative rotational motion between the pipe and said pipe fastening element, and a manipulable portion to facilitate rotation of said pipe fastening element;

wherein said flexible pipe engaging portion includes at least two flexible strips defining an inner wall of said recess, and portions of an integral, external screw thread on said at least two strips adapted and configured to cut and engage the interior wall of the pipe, said at least two strips being disposed adjacent said annular groove and arranged for selective movement into said annular groove, during quick connect, and out of said annular groove as said at least one strip slides along said sloping shoulder until said at least one strip abuts against said sloping shoulder and said portions of said integral, external screw thread cut into and engage the interior wall of the pipe until the pipe is fully secured on said screw thread portions of said at least two strips preventing the pipe from sliding off the fitting.

* * * * *